(12) United States Patent
Gilbert

(10) Patent No.: US 7,568,016 B2
(45) Date of Patent: *Jul. 28, 2009

(54) COOKIE MANAGEMENT SYSTEMS AND METHODS

(75) Inventor: Lanny Gilbert, Atlanta, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/126,001

(22) Filed: May 23, 2008

(65) Prior Publication Data

US 2008/0222270 A1 Sep. 11, 2008

Related U.S. Application Data

(63) Continuation of application No. 09/746,325, filed on Dec. 21, 2000, now Pat. No. 7,379,980.

(51) Int. Cl.
| | |
|---|---|
| G06F 15/177 | (2006.01) |
| G06F 15/16 | (2006.01) |
| G06F 3/00 | (2006.01) |
| G06F 7/00 | (2006.01) |
| G06F 17/30 | (2006.01) |
| G06F 15/173 | (2006.01) |

(52) U.S. Cl. .................. 709/220; 707/10; 709/203; 715/745

(58) Field of Classification Search .......... 709/203, 709/220; 707/10; 715/745

See application file for complete search history.

(56) References Cited

U.S. PATENT DOCUMENTS 5,966,705 A   10/1999 Koneru et al.

7,379,980 B1 * 5/2008 Gilbert ............... 709/220

OTHER PUBLICATIONS

Kristol, D. et al. "Request for Comments (RFC) 2965: HTTP State Management Mechanism", Oct. 2000, 26 pages.
"privacy.yahoo.com" articles dated Aug. 15, 2000 concerning Yahoo! Wallet., Examiner numbered pp. 1-8.
"www.microsoftpassport.com" articles dated Mar. 4, 2000, Examiner numbered pp. 1-26.

* cited by examiner

Primary Examiner—George C Neurauter, Jr.
(74) Attorney, Agent, or Firm—Cantor Colburn LLP

(57) ABSTRACT

A cookie management system serves as a central storage location for information and other data on users. A user's machine contains a cookie having a key and the cookie management system associates user information with this key. Upon receiving a request from a user, a web site retrieves the key from the user's machine and queries the cookie management system for the user information. The cookie management system retrieves the data associated with the key and returns the user information to the site. The sites therefore do not need to store information on all users nor do they need to place their own cookies on the user's machine. If sites obtain more data about a user during an interaction, the sites send this data to the cookie management system which updates its database. The user's machine may contain multiple cookies that correspond to different people and the site can prompt the user to select the appropriate one. The cookies may correspond to the same user and specify different amounts or categories of information. The user may supply a password to enable sites to access their data from the cookie management system.

24 Claims, 6 Drawing Sheets

COOKIE MANAGEMENT SYSTEMS AND METHODS

CROSS-REFERENCE TO RELATED APPLICATIONS

This application is a continuation of U.S. patent application Ser. No. 09/746,325 filed Dec. 21, 2000, the contents of which are incorporated herein by reference in their entirety.

FIELD OF THE INVENTION

The present invention relates generally to systems and methods for managing user information and, more particularly, to systems and methods for managing cookies that contain user information.

BACKGROUND INFORMATION

The Internet, by its design, is basically an anonymous medium. The Internet is a group of networked computers with each of the computers being assigned an IP addresses. The IP address is a set of four numbers that are used in routing communications between the computers. While the IP address provides useful routing information, the IP address really does not provide any information about the actual user. Consequently, when a user visits a web site, the user will have just its IP address revealed to the web site and the web site cannot directly detect anything else about the user.

Despite the anonymity of the Internet, many sites on the Internet strive to learn something about users that visit their site. These sites believe that by personalizing the site to the users, the users have a more enjoyable experience and are more likely to be a repeat user. By personalizing the site to the user, sites also hope that they can increase the effectiveness of the site, whether it be increased sales, increased revenue from advertising, or simply increased traffic. The personalization can take many forms, including providing a special greeting which mentions the user by their name, customized settings such as a MyPage, advertising that is targeted to the interests of the user, and automatically logging the user into the site.

One common way that many sites perform personalization will now be described with reference to FIG. 1. A user 5 goes through the Internet 10 to a web site 15. During the course of a visit at the web site 15, the user 5 provides or reveals some useful information about the user 5. The information may be information input by the user, such as the user's name, address, or email address, or may be information that is more indirectly detected by the web site 15, such as the type of information that is of interest to that user that is estimated by the requested pages. At this time, the web site 15 now has the IP address of the user and some information about the user. The web site 15 could construct a database associating that information with that IP address. A problem with this approach is that many IP addresses are dynamically assigned to users so the web site cannot know for sure if the same user 5 is associated with any given IP address.

To provide some correlation between information about a user and a user's computer 5, many web sites 15 employ cookies. A cookie is a small data file that is sent from the web site 15 and stored on the user's computer 5. Most computers have browsers that allow a user to control the storage of cookies on their computer 5 and give several options so a user can choose to prevent any cookie from being stored, to accept all cookies, or to accept cookies only after being warned that a cookie is about to be written to the computer 5. The web site 15 can therefore create a cookie that provides some identification of the user and then store the cookie on the user's computer 5. The next time that the user visits the web site 15, the web site 15 reads the cookie from the user's computer 5 and then retrieves the information about the user from the web site's database in order to provide some personalization. The web site 15 can therefore remember aspects of the user even if the user is assigned a different IP address the next time the user visits the site 15.

As mentioned above, cookies allow web sites to internally correlate a user with some information and typically include some coded information, such as an id number, a reference domain name, and a series of numbers. The information within a cookie is typically useless to another web site. Thus, a second web site 20 first of all probably would not even know that the web site 15 stored a cookie on the user's computer 5. Even if the web site 20 did know about the cookie and read that cookie, the cookie would not by itself give the web site 20 any useful information on the user 5. Consequently, the second web site 20 needs to obtain or detect information about the user5, create its own database, and place its own cookie on the user's computer 5.

In addition to requiring duplication of effort at the various web sites, the need for each web site to store its own cookies on a user's computer 5 also requires duplication of effort by the user. Each time a user visits a new web site, the user provides information to the site and/or goes through a process whereby the site can detect information about the user. For example, the user may need to register at the site and/or request a set of pages before the web site can learn information about the user. Unfortunately, the user cannot easily provide such information to sites but instead must go through this trouble with each new site.

Even with the best profiling technology, a web site can learn only a limited amount of information about a user. A web site has a relatively brief encounter with a user and from this brief encounter the site tries to learn as much as possible about the user. A single visit to a site can provide some clues about the user, such as the user's interests. A single visit, however, is just a snap shot in time and may not accurately reflect the true interests of the user. The information may prove to be inaccurate for many reasons, such as the user was searching for a friend, another person was using the user's computer, the user's interests changed over time, or the web site simply guessed wrong in estimating the information. A need therefore exists for ways in which to more accurately obtain useful and accurate information on users.

SUMMARY OF THE INVENTION

The present invention addresses the problems described above by providing systems and methods for managing information on users. In the preferred embodiment of the invention, the systems and methods relate to managing cookies that allow web sites to obtain useful information on its visitors. According to one aspect, information on a plurality of users is store and associated with a plurality of keys and the user information is available to a plurality of entities, such as to multiple web sites. When a user issues a request to a system on the Internet, such as to a web server at a web site, the web server retrieves a cookie from the user's machine. The web server takes a key contained in the cookie and forwards the key to a cookie management system. The cookie management system retrieves the information associated with that key and returns the information to the requestor, which in this example is the web server. The web server can the use the information in responding to the user's request, such as by personalizing the web site's response to the user. Advantageously, the same cookie can be used by multiple web sites to obtain user information.

In the preferred embodiment, the cookie management system serves as a central storage location for information on a plurality of users. Web sites and other systems desiring user information need not compile their own databases and place their own cookies on the user machines but instead can rely on the cookie management system to perform these functions. The web sites and other systems can therefore simplify their operations and not worry about such things as creating a database and generating profiles on all users. The user benefits in having multiple sites and other systems know aspects of the user with minimal effort on behalf of the user. Additionally the user's machine need not be cluttered with cookies from all of the sites that the user has visited but instead could contain the single cookie having the key used by the cookie management system.

Preferably, users are given some control over the information that can be released over the Internet. One way in which users can have control is by the user directly providing the information to the cookie management system. Also, the cookies may be password protected and sites are unable to obtain user information from the cookie management system unless they also obtain a user-supplied password. The user's can therefore create the data and also selectively release the data to just those sites that receive their permission.

A user's machine can contain more than one cookie and these multiple cookies may correspond to different people who use the same machine. When a site or other system sees that multiple cookies have been placed on the user's machine, the site asks the user to select one of them. Preferably, the cookies are encoded with the person's name and the site displays the list of names from which the user can select. Instead of referring to different people, the cookies could relate to the same person but correspond to different sets of data on the user. By controlling which cookie a site can use, the user can effectively control what set of information the user wants that site to have.

According to another aspect of the invention, the cookie management system can accept updates to the user information. During the course of some interaction between the user and a web site, the web site may gain some useful information about the user. The web site can forward this information to the cookie management system which will then update its database. The exchange of information and other data between web sites and the cookie management system is preferably through XML.

BRIEF DESCRIPTION OF THE DRAWINGS

The accompanying drawings, which are incorporated in and form a part of the specification, illustrate preferred embodiments of the present invention and, together with the description, disclose the principles of the invention. In the drawings.

DETAILED DESCRIPTION

Reference will now be made in detail to preferred embodiments of the invention, non-limiting examples of which are illustrated in the accompanying drawings.

Systems and methods according to preferred embodiments of the invention allow for more efficient and effective uses of cookies. A network according to a preferred embodiment of the invention will now be described with reference to FIG. 2. The network includes a plurality of users having machines 5 for accessing the Internet. These machines 5 can be any type of device, such as a computer, WAP-enabled phone or other mobile telephone, a Palm, Pocket PC, Visor, or other Personal Digital Assistant (PDA), WebTV, enhanced TV, digital TV, or other TV product, etc. The invention is not limited to the above-listed machines but may use any suitable device to access the Internet.

The network also includes a plurality of systems 27 and 33 accessible through the Internet. For the purposes of this description, the systems 27 and 33 are web servers which deliver web pages to the user in response to user requests. In addition to web servers associated with web sites, the systems 27 and 33 include other types of systems accessible through the Internet, such as application service providers or other systems providing data or services to users.

The network also includes a cookie management system 30 which communicates with the web servers 25 and 27. As will be described in more detail below, the cookie management system 30 serves as a central location for storing information about users that can be accessed through cookies by multiple requestors. When web sites, such as web servers 25 and 27, obtain information on users, the web servers 25 and 27 can forward the information to the cookie management system 30. When other sites then desire information on a particular user, the sites can obtain this information from the cookie management system 30.

Figure 1:
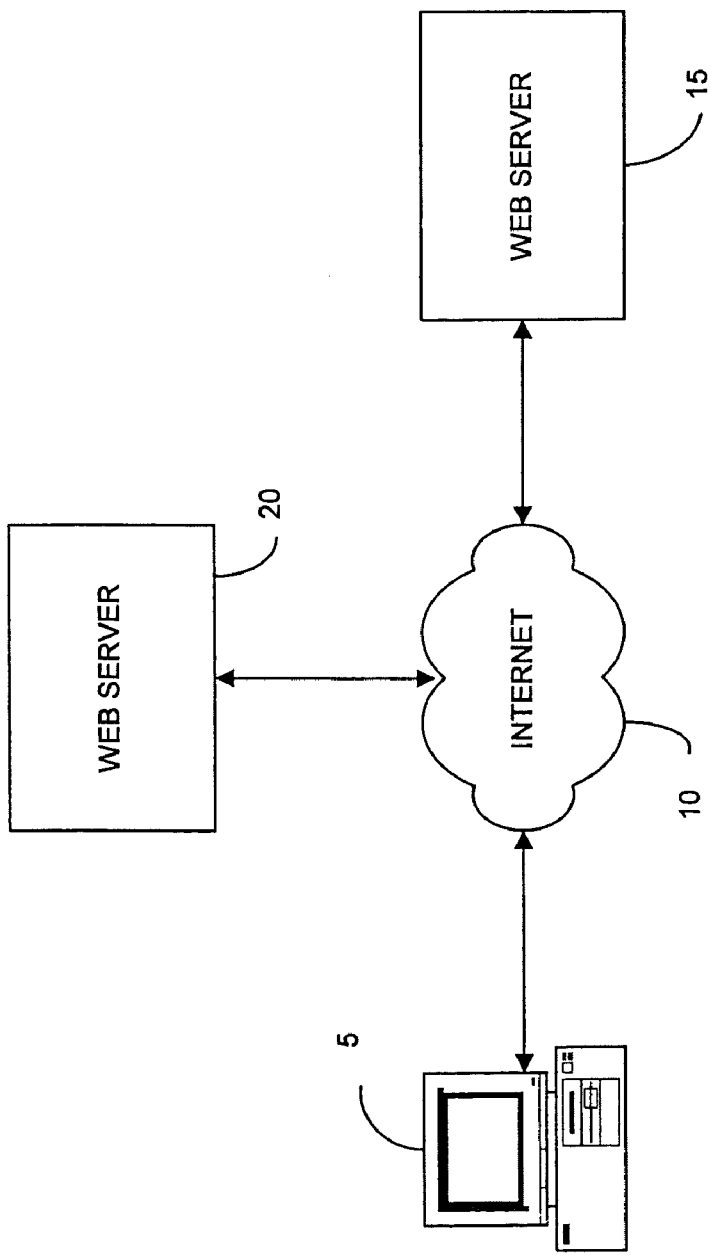
FIG. 1 is a block diagram of a conventional network showing a user's computer connected to a web site through the Internet.
Figure 2:
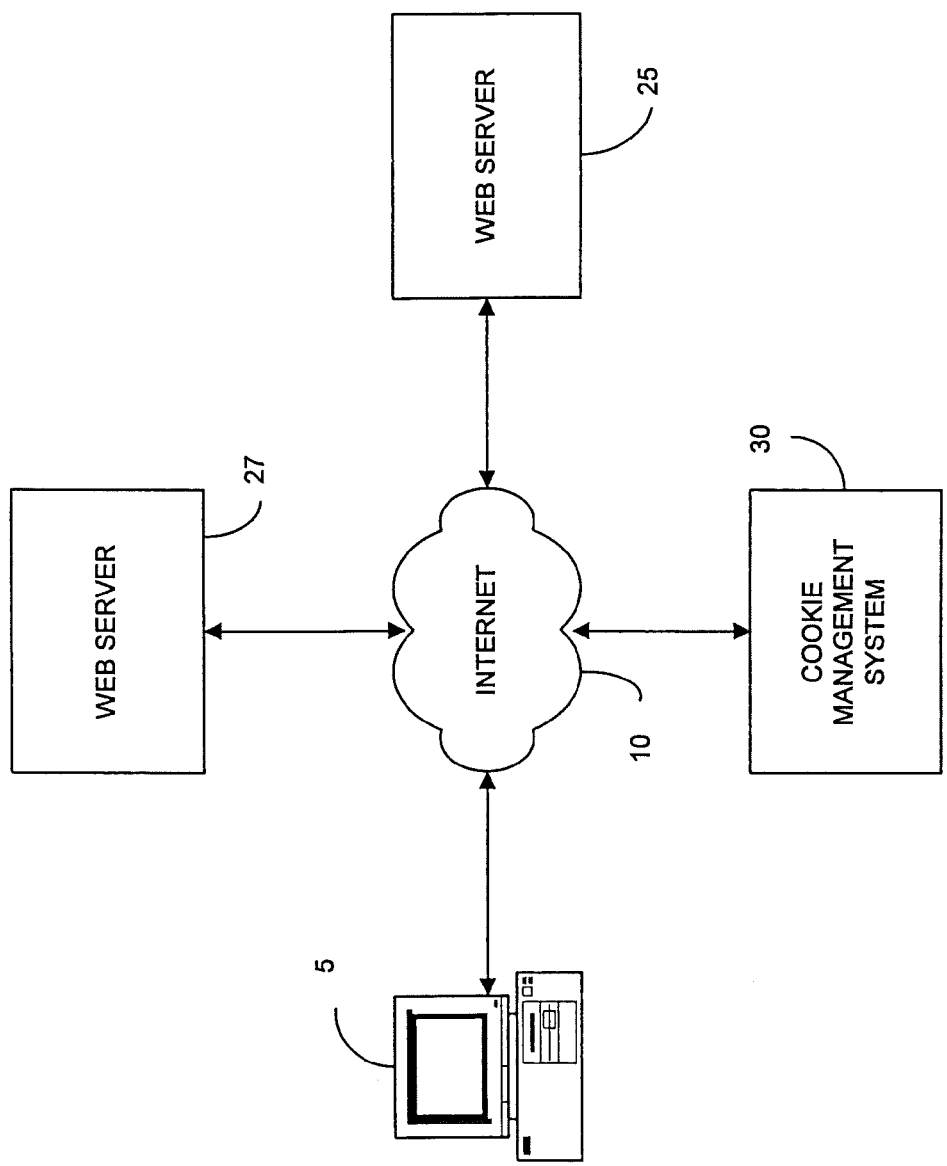
FIG. 2 is a block diagram of a network according to an embodiment of the invention showing a cookie management system.
Figure 3:
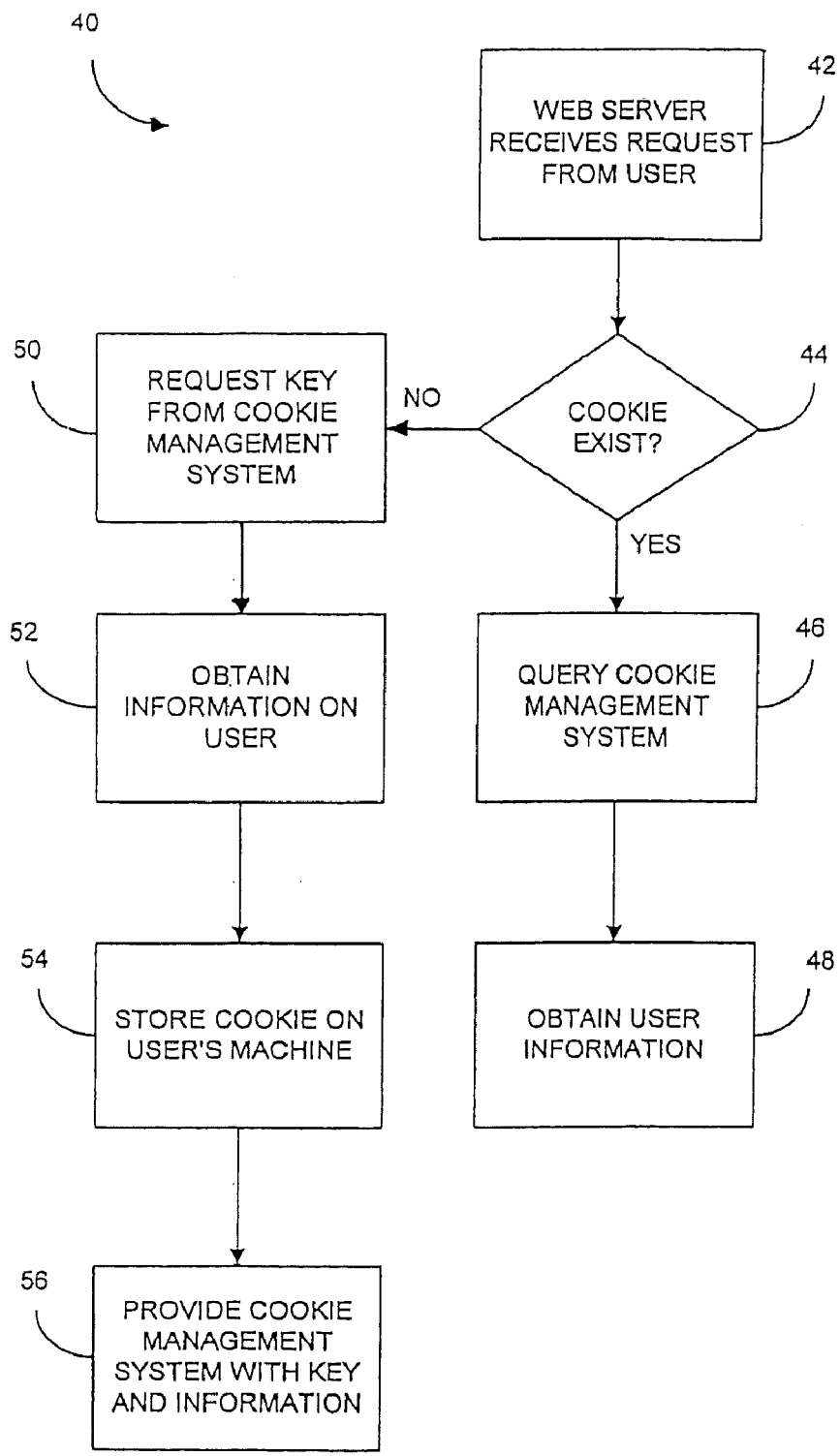
FIG. 3 is a flow chart of a method of operation for the network in FIG. 3.

A method 40 of operation of the network shown in FIG. 2 will now be described with reference to FIG. 3. At 42, a requestor, such as web site having web server 25, receives a request from a user, such as through user's machine 5. The web server 25 at 44 checks whether a cookie has already been stored on the user's machine 5. The cookie follows a format that identifies it as being associated with the cookie management system 30 and also contains a key. If the cookie exists, then at 46 the web server 25 queries the cookie management system 30 for information about a user associated with the key retrieved from the cookie. At 48, the cookie management system 30 returns the information on the user to the web server 25, which can then make use of the information in any suitable manner, such as by personalizing the information returned to the user in response to the user's request.

If the cookie does not exist as determined at 44, then at 50 the web server 25 requests an available key from the cookie management system 30. The web server 25 gathers information on the user at 52, such as from direct input from the user or indirectly through observation. The web server 25 then generates a cookie at 54 and stores it on the user's machine. The web server 25 also provides the cookie key and related information to the cookie management system 30 at 56. In other embodiments of the invention, the web server 25 may not need to obtain a key from the cookie management system 30 but may be able to independently ascertain an acceptable key. Also, the web server 25 preferably provides the information to the cookie management system 30 after writing the cookie on the user's machine 5 so that the user information is stored in the cookie management system 30 only after the web server 25 knows that the cookie was successfully written to the user's machine 5. Alternatively, the web server 25 could provide the information and key to the cookie management system 30 prior to writing the cookie on the user's machine 5.

Once the cookie has been placed on the user's machine 5, a second requestor, such as a second site on the Internet with web server 27 can obtain information on the user. For example, at 42 when the web server 27 receives a request from the user's machine 5, the web server 27 checks to see if a cookie exists. Since the web server 25 had previously place the cookie on the user's machine 5, the web server 27 will detect the cookie and then at 46 provide the key found in the cookie to the cookie management system 30. Based on this key, the cookie management system 30 performs a look-up in its database to retrieve the data associated with the user's machine 5 and then provides this data to the web server 27.

Figure 4:
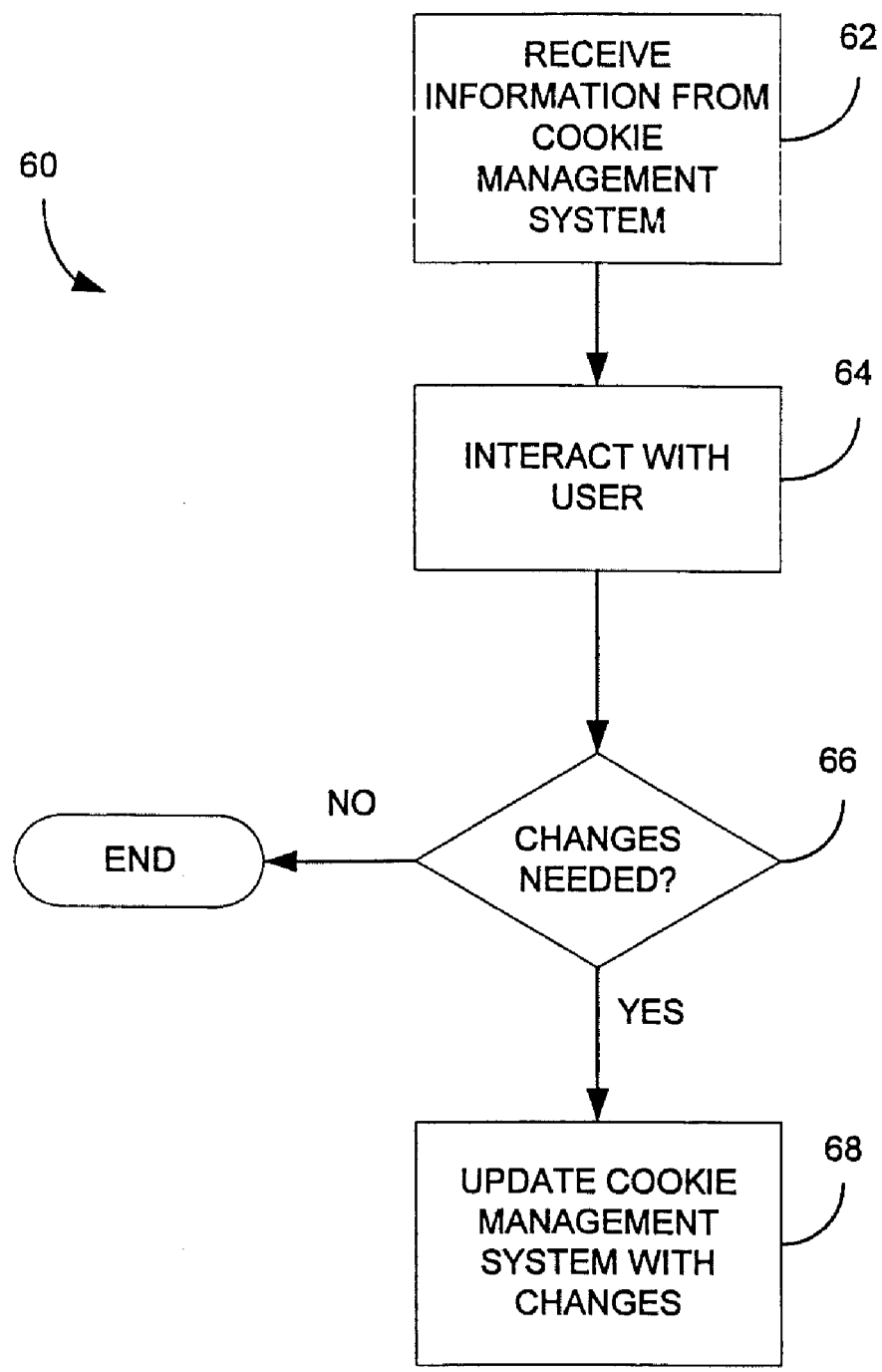
FIG. 4 is a flow chart of a method of operation for a system interacting with a user and obtaining user information from the cookie management system.

A method 60 performed by a requestor of information from the cookie management system 30, such as a web server will now be described with reference to FIG. 4. At 62, the web server receives information from the cookie management system 30. This information may have been just recently obtained from the cookie management system 30 in response to a user's request and the web server subsequently querying the cookie management system 30 with a cookie key. Alternatively, the information may have been previously obtained by the web server, such as from a prior query to the cookie management system 30 and stored locally at the web server.

Next, at 64, the web server interacts with the user and, during this interaction, obtains some information on the user. As described above, the information on users can be obtained directly from input by the user or indirectly, such as by observing user requests. At 66, the web server determines if the information most recently obtained from the user dictates any changes from the information obtained from the cookie management system 30. The changes may be desired for any number of reasons, such as the recently obtained information is new and is above and beyond the information obtained from the cookie management system 30. Also, the changes could be desired since they differ from what was obtained from the cookie management system 30. For example, the user interests may have changed or the web server may have been able to better detect the true interests of the user.

In any event, if changes are desired, at 68 the web server provides the cookie management system 30 with the updated information. The cookie management system 30 then updates its database to reflect the more comprehensive and/or accurate information on the user. On the other hand, if no changes are needed, then the method 60 terminates since the web server need not provide any type of update to the cookie management system 30.

Figure 5:
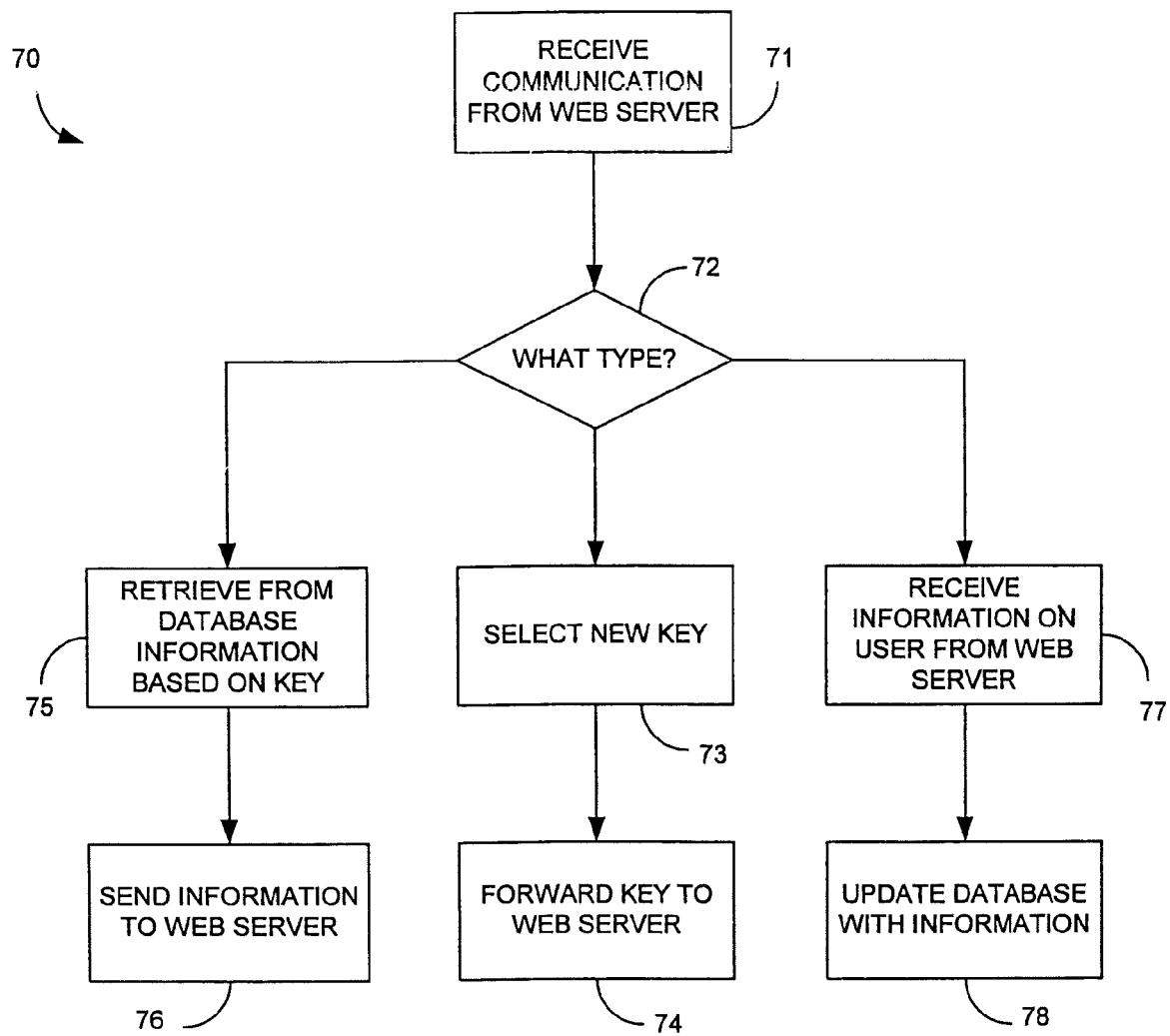
FIG. 5 is a flow chart of a method of operation for the cookie management system.

A method 70 of operation for the cookie management system 30 will now be described with reference to FIG. 5. At 71, the cookie management system 30 receives some type of communication from a requestor through the Internet. Again, the requestor is not limited to any specific type of hardware or software but can be any type of computer, machine, or other device that desires or has information on users. For the purposes of this description, the requestor will be a web server, such as web servers 25 and 27. The cookie management system 30 at 72 next determines the type of communication. If the communication is a request for a new key, then at 73 the cookie management system 30 selects a new key and forwards the key to the web server at 74. If, on the other hand, the communication is a query for data associated with a key, then at 75 the cookie management system 30 retrieves the data from its database using the key and then at 76 provides the data to the web server. If the communication is an update, then at 77 the cookie management system 30 takes the data received from the web server and at 78 updates its database to reflect the new data. The updating may involve adding new data which is associated with the key and/or replacing some of the data already stored in its database.

The cookie and the key may have any suitable format. As an example, the cookie may have the following format: COOKIE_SERVER_DB_KEY=<Server generated key>. In this example, the cookie itself does not contain any other information other than the key itself and an identification of the cookie management system. In other embodiments of the invention, the cookie may contain some data and additional data can be obtained from the cookie management system 30. The data sent from the cookie management system 30 to the web servers and also data that is sent to the cookie management system 30 from the web servers are preferably in the XML format.

The invention offers many advantages to both users and requestors that the user interacts with over the Internet. For example, some information about the user can be readily available to any site that has access to the cookie management system. This information can include the user's name and address, which means that the user need not reenter this information at every site when the user desires to receive something through the mail. The information stored in the cookie management system 30 may include data on the user's interests which means that sites can tailor their responses to user's request to make it more interesting to the user. This tailoring would preferably include targeting advertisements to the user and would allow the sites to charge higher rates for advertisements. The information in the cookie management system 30 may also include credit card information or any other data that a site on the Internet can directly or indirectly derive from a user.

As should be apparent to those skilled in the art, the information that can be stored at the cookie management system 30 and made available to sites may raise privacy concerns if not carefully controlled. The user may want to severely limit access to certain information, such as credit card data. According to another embodiment of the invention, the user can control and perhaps even create the data that is stored in the cookie management system 30. According to this aspect, the user goes to the cookie management system 30 and registers at the site. This registration process involves having the user input the data that the user is comfortable sharing over the Internet. The cookie management system 30 can then store the cookie directly onto the user's machine 5. Other sites, such as web servers 25 and 27, could not add new data to the cookie management system 30 but would be able to obtain the data that the user has input through the cookie management system 30.

According to another embodiment, the cookie management system 30 prevents access to the information on a user unless the cookie management system 30 receives both the key and also a user supplied password. As discussed above, when a user visits a site, the site obtains the key from a cookie on the user's machine 5 and queries the cookie management system 30 for data associated with that key. Preferably, the cookie management system 30 ensures that the site is authorized to obtain the data, such as by requiring some password from the site or by looking up the IP address for the site. In addition to this type of security, the user may also have some control over what sites can obtain information from the cookie management system 30. For example, when a user visits a site, the site reads the cookie and obtains the key associated with that user. Before the site can query the cookie management system 30, the site must additionally obtain a password from the user which effectively grants that site permission to use the data in the cookie management system 30. One way in which the site can obtain this password is by having the user enter it at the site. Preferably, the terms of use for accessing the cookie management system 30 requires that the site not store the user supplied password so that each time a site seeks data from the cookie management system 30 the site must obtain the user-supplied password.

According to yet another embodiment of the invention the user's machine may have a plurality of cookies and related keys. The cookies may correspond to different users who use the same machine 5. When a site detects that one machine 5 contains multiple cookies for the cookie management system 30, the site asks the user to select one of the cookies. The cookies preferably contain data that identifies the user associated with that cookie, whereby the user can simply detect his or her name from a list of names.

In addition to having multiple cookies for a corresponding multiple number of users, a single user can have multiple cookies stored on the machine 5. The cookies may correspond to different categories or levels of data on the user. For example, a first cookie may contain data that identifies interests of the user, such as fly-fishing, but not contain any data that directly identifies the user. A second cookie may contain some additional data on the user, such as the user's name and address, as well as the user's interests. A third cookie can then contain the most comprehensive amount of data on the user and include the user's credit card information. In addition to the keys, these cookies preferably identify the classification of the cookie, such as "Interests Cookie," "Name and Interests Cookie," and "Credit Card, Name, and Interests Cookie" and the site prompts the user to select one of the cookies and supply a password. The cookies, of course, may have other names, such as "Public Cookie," "Confidential Cookie," and "Secret Cookie." Instead of needing to select the cookie and supply a password, the user can simply supply a password which corresponds to just one of the cookies. The user can therefore input the password corresponding to the amount and type of information the user wants the site to have. This password along with the keys for all cookies are provided to the cookie management system 30 which then matches the password with the associated cookie. The cookie management system 30 retrieves the data associated with that cookie and provides it to the site.

Figure 6:
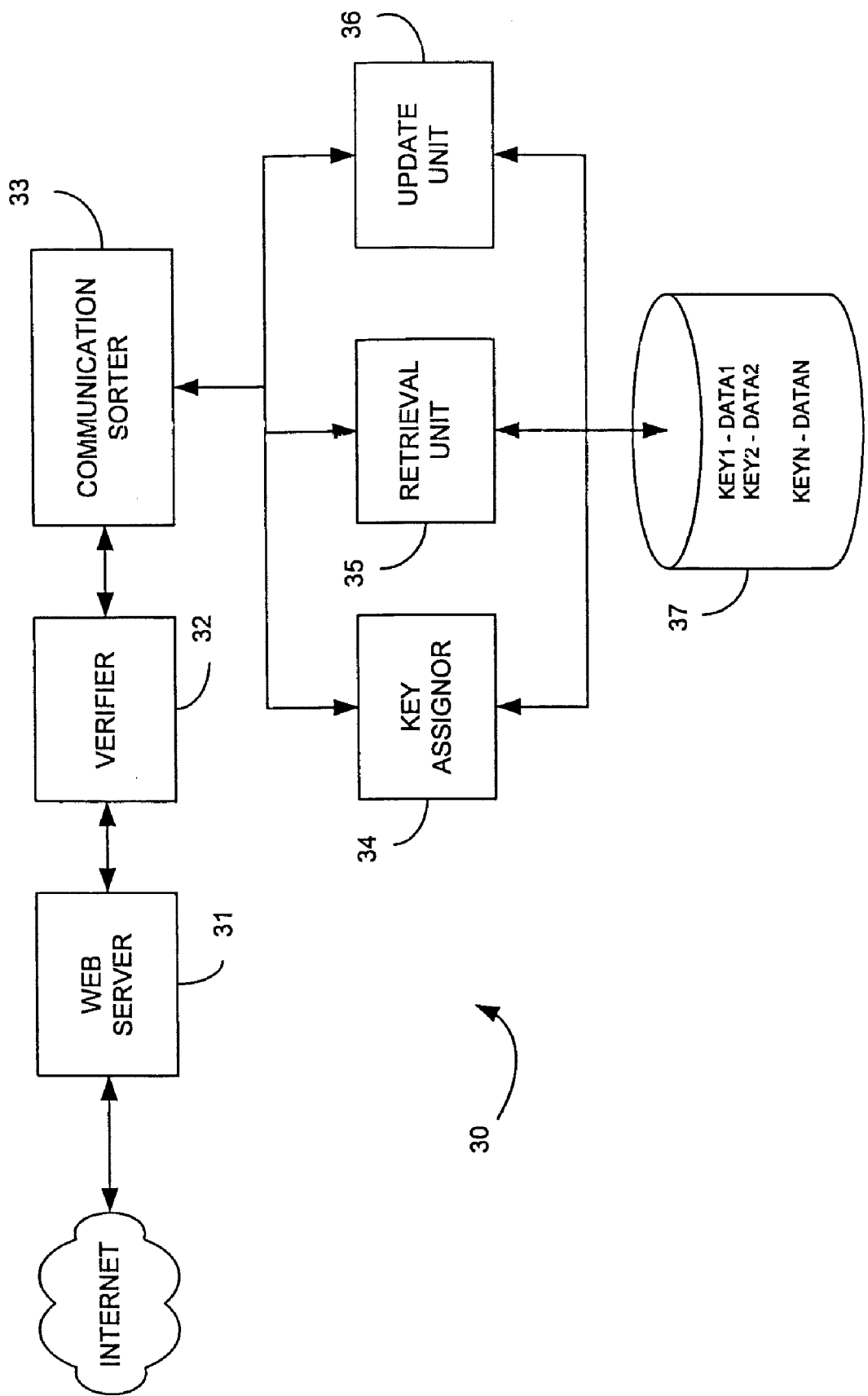
FIG. 6 is a block diagram of a cookie management system according to one embodiment of the invention.

An example of a block diagram for the cookie management system 30 is shown in FIG. 6. The cookie management system 30 includes a web server 31 for receiving requests and communications from users and requestors, such as web sites or other systems seeking or having user information. The web server 31 sends these communications to a verifier 32 for verifying that the requestors are authorized to interact with the cookie management system 30. The verifier may authenticate the individual requestor such as a web site, confirm that it has an account with the cookie management system 30, that such an account is current, and check any user-supplied passwords.

If the communication is authorized and verified, then the verifier 32 sends the communication to a communication sorter 33. The sorter 33 evaluates the communication and determines an appropriate unit to receive the communication. If the communication is a request for a new key, such as for a new user not in database 37, then the sorter 33 sends the communication to a key assignor 34. If the communication is a request for data on an individual the sorter 33 forwards the request to a retrieval unit 35 and if the communication contains new data on a user, then the sorter 33 sends the communication to an update unit 36. The key assignor 34, retrieval unit 35, and update unit 36 have access to the database 37 containing user data associated with keys, such as data1, . . . dataN associated with key1, key2, . . . keyN, respectively. The outputs from the key assignor 34, retrieval unit 35, and update 36 are sent back through the sorter 33 and sent to the requestor of the communication by the web server 31. FIG. 6 illustrates just one example of how the cookie management system 30 may operate and it should be understood that the system 30 may be structured in other ways.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What is claimed is:

1. An method for providing information about a plurality of users to a plurality of requesters, the method comprising:

storing information about the plurality of users in a database located on a cookie management system and associating information about the plurality of users with a plurality of keys;

receiving a request at the cookie management system for information about a particular user of the plurality of users from a requester;

receiving a key associated with the request at the cookie management system from the requester, wherein the key associated with the request is included in a cookie on a machine of the particular user;

using the key associated with the request to retrieve information about the particular user from the database; and forwarding information about the particular user to the requestor;

wherein the requester determines whether the cookie exists on the machine of the particular user, and in response to determining that the cookie does not exist on the machine of the particular user, the requester:

indirectly obtains information about the particular user;

generates and stores the cookie including the key on the machine of the particular user; and provides the key and the information about the particular user to the cookie management system.

2. The method as set forth in claim 1, wherein storing information comprises associating a different key for information about each user.

3. The method as set forth in claim 1, wherein storing information comprises storing multiple sets of information for at least some of the users with each set of information being associated with a different key.

4. The method as set forth in claim 1, further comprising checking that the requester is authorized to obtain the information about the particular user.

5. The method as set forth in claim 1, wherein forwarding comprises sending the information in XML format.

6. The method as set forth in claim 1, further comprising receiving new information about the user from the requester and updating the database with the new information.

7. The method as set forth in claim 1, further comprising selecting an available key for a user and supplying the new key to the requestor so that the requestor can store the new key as the cookie on the machine of the particular user.

8. The method as set forth in claim 1, wherein associating information about the plurality of users with the plurality of keys includes associating information about the plurality of users with the plurality of keys according to one of different categories and different levels of information about the particular user and the method further comprises:
   receiving a plurality of user-supplied passwords, each user-supplied password of the plurality of user-supplied passwords corresponding to each key of the plurality of keys; and
   using only each user-supplied password corresponding to each key of the plurality of keys to retrieve the information about the particular user from the database, wherein each user-supplied password corresponds to an amount and type of information about the particular user that the particular user wants the requester to have.

9. The method as set forth in claim 1, wherein the requestor provides information about the particular user to the cookie management system after writing the cookie on the machine of the particular user so that information about the particular user is stored in the cookie management system only after the requestor knows that the cookie is successfully written to the machine of the particular user.

10. An method of obtaining information about a user, the method comprising:
   receiving at a requester a request from a user machine;
   retrieving, in a retrieving operation, a cookie including a key from the user machine, wherein the retrieving operation includes determining by the requester whether the cookie exists on the user machine, and wherein in response to the requester determining that the cookie does not exist on the user machine, the requestor:
      indirectly obtaining information about a user at the user machine;
      generating and storing the cookie including the key on the user machine; and
      providing information about the user and the key to the cookie management system;
   obtaining the key included in the cookie;
   sending a query from the requester to the cookie management system for data associated with the key; and
   receiving a set of data associated with the key, wherein the set of data associated with the key includes information about the user.

11. The method as set forth in claim 10, wherein receiving the set of data comprises receiving the set of data in XML format.

12. The method as set forth in claim 10, further comprising using data about the user in responding to the request from the user machine.

13. The method as set forth in claim 10, wherein retrieving the cookie includes retrieving at least one cookie from the user machine.

14. The method as set forth in claim 10, further comprising receiving a request from a second user machine, checking for cookies on the second user machine, sending a query for an available key when the second user machine does not contain any cookies, and placing a second cookie with the available key on the second user machine.

15. The method as set forth in claim 10, further comprising obtaining new information about the user and sending the new information and the key.

16. The method as set forth in claim 10, further comprising:
   associating information about the user with a plurality of cookies according to one of different categories and different levels of data about the user;
   receiving a plurality of user-supplied passwords, wherein each user-password of the plurality of user-supplied passwords corresponds to each cookie of the plurality of cookies; and
   receiving information about the user associated with each user-supplied password, wherein each user-supplied password corresponds to an amount and type of information that the user wants the requester to have.

17. The method as set forth in claim 10, wherein providing information about the user to the cookie management system comprises providing information about the user to the cookie management system after writing the cookie to the user machine so that information about the user is stored in the cookie management system only after the requestor knows that the cookie is successfully written to the user machine.

18. A cookie management system for storing information about a plurality of users and for providing information about the plurality of users to a plurality of requestors, the cookie management system comprising:
   a memory;
   a database for storing information about the plurality of users and for associating information about the plurality of users with a plurality of keys;
   a server for receiving a request from a requestor for a set of information about a particular user of the plurality of users, the request including a key stored as part of a cookie on a machine of the particular user, wherein the machine of the particular user is a computer; and
   a retrieval unit for receiving the key and for retrieving the information about the particular user associated with the key;
   wherein the server obtains the set of information about the particular user from the retrieval unit and forwards the information about the particular user to the requestor,
   wherein the requestor determines whether the cookie exists on the machine of the particular user, and in response to determining that the cookie does not exist on the machine of the particular user, the requestor:
      indirectly obtains the set of information about the particular user;
      generates and stores the cookie including the key on the machine of the particular user; and
      provides the key and the set of information about the particular user to the cookie management system.

19. The cookie management system as set forth in claim 18, further comprising a key assignor for assigning, in the database, available keys to new users.

20. The cookie management system as set forth in claim 18, further comprising an update unit for storing new information about users in the database.

21. The cookie management system as set forth in claim 18, further comprising a verifier for verifying that the requestor is authorized to receive the set of information about the particular user.

22. The cookie management system as set forth in claim 18, wherein the server forwards the set of information about the particular user to the requestor in XML format.

23. The cookie management system as set forth in claim 18, wherein the database associates the set of information about the plurality of users with the plurality of keys according to one of different categories and different levels of the information about the particular user;

wherein the server further receives a plurality of user-supplied passwords, wherein each user-supplied password of the plurality of user-supplied passwords corresponds to each key of the plurality of keys; and wherein the retrieval unit receives only user-supplied passwords which are used by the requestor to retrieve the set of information about the particular user associated with each user-supplied password, and wherein each user-supplied password of the plurality of user-supplied passwords corresponds to an amount and type of the set of information about the particular user that the particular user wants the requestor to have.

24. The cookie management system as set forth in claim 18, wherein the requestor provides information about the particular user to the server after writing the cookie to the machine of the particular user so that information about the particular user is stored in the server only after the requestor knows that the cookie is successfully written to the machine of the particular user.

\* \* \* \* \*